(12) United States Patent
Kim

(10) Patent No.: US 8,530,079 B2
(45) Date of Patent: Sep. 10, 2013

(54) RECHARGEABLE BATTERY

(75) Inventor: Yong-Sam Kim, Suwon-si (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 455 days.

(21) Appl. No.: 12/801,538

(22) Filed: Jun. 14, 2010

(65) Prior Publication Data

US 2010/0323239 A1    Dec. 23, 2010

(30) Foreign Application Priority Data

Jun. 23, 2009  (KR) .................. 10-2009-0056160

(51) Int. Cl.
*H01M 2/02* (2006.01)
(52) U.S. Cl.
USPC ..................... 429/181; 429/178; 29/623.1
(58) Field of Classification Search
USPC ................................. 429/121–347
See application file for complete search history.

(56) References Cited

U.S. PATENT DOCUMENTS

2006/0040176 A1*  2/2006  Ling et al. .................. 429/160

FOREIGN PATENT DOCUMENTS

| JP | 2001-325938 A | 11/2001 |
|---|---|---|
| JP | 2002-175792 A | 6/2002 |
| JP | 2003-157812 A | 5/2003 |
| JP | 2004-030946 A | 1/2004 |
| JP | 2005-267945 A | 9/2005 |
| JP | 2005-276660 A | 10/2005 |
| JP | 2007-018968 A | 1/2007 |

OTHER PUBLICATIONS

Sato et al. (JP 2005-267945 A). Sep. 29, 2005. English machine translation by JPO).*
Notice of Allowance in KR 10-2009-0056160, dated Jun. 7, 2011 (KIM).

* cited by examiner

*Primary Examiner* — Basia Ridley
*Assistant Examiner* — James Lee
(74) *Attorney, Agent, or Firm* — Lee & Morse, P.C.

(57) ABSTRACT

A rechargeable battery includes an electrode group with a separator, a positive electrode, and a negative electrode in a case, a cap plate for sealing the case and including a terminal hole, an electrode terminal extending through the terminal hole, and a lead tab connecting the electrode terminal to the electrode group. The lead tab includes a horizontal part connected to the electrode terminal, a first vertical part and a second vertical part spaced apart from each other and extending from the horizontal part in a vertical direction along the electrode group, and a connection part connecting the first vertical part and the second vertical part, the connection part being spaced apart from the horizontal part to define a gas outlet that overlaps an end part of the electrode group.

20 Claims, 9 Drawing Sheets

RECHARGEABLE BATTERY

BACKGROUND

1. Field

Example embodiments relate to a rechargeable battery. More particularly, example embodiments relate to a rechargeable battery that can discharge gas generated in an electrode group.

2. Description of the Related Art

A rechargeable battery may include an electrode group having a jelly roll form with a separator, a positive electrode, and a negative electrode that are provided on both surfaces of the separator and are wound together, a case that houses the electrode group, a cap plate that closes and seals an opening of the case, electrode terminals that are electrically connected to the electrode group and that protrude to the outside of the cap plate through the cap plate, and a lead tab that connects the electrodes of the electrode group to the electrode terminals. Gas generated in the electrode group may be discharged to a vent.

The above information disclosed in this Background section is only for enhancement of understanding of the background of the described technology and therefore it may contain information that does not form the prior art that is already known in this country to a person of ordinary skill in the art.

SUMMARY

Embodiments are therefore directed to a rechargeable battery, which substantially overcomes one or more of the problems due to the limitations and disadvantages of the related art.

It is therefore a feature of an embodiment to provide a rechargeable battery having a lead tab structure enabling smooth discharging of gas from an end part of an electrode group while securing welding rigidity with the electrode group.

At least one of the above and other features and advantages may be realized by providing a rechargeable battery, including an electrode group that is formed by winding a separator and an positive electrode and negative electrode that are formed in both surfaces of the separator, a case that houses the electrode group, a cap plate that closes and seals an opening that is formed at one side of the case, an electrode terminal that is installed in a terminal hole that is formed in the cap plate to be extended to the inside and outside of the case, a lead tab having one side that is connected to the electrode terminal and the other side that is connected to the electrode group, wherein the lead tab includes a horizontal part that is connected to the electrode terminal, a first vertical part and a second vertical part that are extended in a vertical direction at both sides of the horizontal part to support a front surface and a rear surface adjacent to a winding end part of the electrode group, and a connection part that forms a gas outlet that opens the end part by connecting parts of each of the first vertical part and the second vertical part to be partially opposite to the end part. The first and second vertical parts may extend along and overlap respective front and rear surfaces of the electrode group.

Edges between respective surfaces among the horizontal part, the first vertical part, the second vertical part, and the connection part may be curved. Each of a connection between the horizontal part and the first vertical part and a connection between the horizontal part and the second vertical part may form a curved section.

The horizontal part may be formed in a curved section at the gas outlet side.

Each of a connection between the connection part and the first vertical part and a connection between the connection part and the second vertical part may form a curved section.

The connection part may include a first connection part that is formed at the ends of the first vertical part and the second vertical part in at least one of opposite sides of the horizontal part.

The first connection part may form a curved section at the gas outlet side.

The connection part may further include a second connection part that is separated from the first connection part to connect the first vertical part and the second vertical part, wherein the second connection part may partition the gas outlet into a first gas outlet that is formed at the first connection part side and a second gas outlet that is formed at the horizontal part side.

The lead tab may be formed by primarily processing a can having an opening in an opposite direction of the end part by performing a drawing process of a plate and secondarily processing five surfaces of the can into the horizontal part, the first vertical part, the second vertical part, and the connection part, and the horizontal part, the first vertical part, the second vertical part, and the connection part may be connected with a curved section.

The rechargeable battery may further include a current collecting plate that is interposed between the end part of the electrode group and the lead tab.

The current collecting plate may be welded to the end part, and the connection part may be welded to the current collecting plate.

The connection part may include a first connection part that is formed at the ends of the first vertical part and the second vertical part at an opposite side of the horizontal part, and a second connection part that is separated from the first connection part to connect the first vertical part and the second vertical part, wherein the current collecting plate may be welded to the first connection part and the second connection part.

The first vertical part and the second vertical part may form an identical gap in an entire vertical direction range. The gap may extend along an entire vertical direction between the first and second vertical parts.

The first vertical part and the second vertical part may include a first gap part that forms a first gap identical to that of the horizontal part in the entire vertical direction range, and a second gap part that is extended to the first gap part to form a second gap that is smaller than the first gap.

The connection part may include a first connection part that connects the end of the second gap part of the first vertical part and the second vertical part, and a second connection part that is separated from the first connection part to connect the second gap parts at the border of the first gap part and the second gap part, wherein the second connection part may partition the gas outlet into a first gas outlet that is formed at the first connection part side and a second gas outlet that is formed at the horizontal part side.

The connection part and the horizontal part may contact opposing ends of each of the first and second vertical parts, the gas outlet being between the connection part and horizontal part. The gas outlet may be an opening with a predetermined width and length, the predetermined width substantially overlapping a majority of a width of the end part of the electrode group, and the predetermined length extending from the horizontal part to the connection part. The gas outlet may expose a majority of the end part of the electrode group, the end part being arranged between the front and rear surfaces of the electrode group and including edges of uncoated portions of the negative and positive electrodes.

At least one of the above and other features and advantages may be realized by providing a method of forming a rechargeable battery, including forming an electrode group in a case, the electrode group including a separator, a positive electrode, and a negative electrode, forming an electrode terminal extending through a terminal hole in cap of the case, and forming a lead tab connecting the electrode terminal to the electrode group, the lead tab including a horizontal part connected to the electrode terminal, a first vertical part and a second vertical part spaced apart from each other and extending from the horizontal part in a vertical direction along the electrode group, and a connection part connecting the first vertical part and the second vertical part, the connection part being spaced apart from the horizontal part to define a gas outlet that overlaps an end part of the electrode group. Forming the lead tab may include drawing a plate to form a can having an opening, such that edges connecting each two faces of the five faces of the can being curved, and processing the five faces of the can into the horizontal part, the first vertical part, the second vertical part, and the connection part, such that the horizontal part, the first vertical part, the second vertical part, and the connection part are connected via curved sections.

BRIEF DESCRIPTION OF THE DRAWINGS

The above and other features and advantages will become more apparent to those of ordinary skill in the art by describing in detail exemplary embodiments with reference to the attached drawings, in which.

Figure 1:
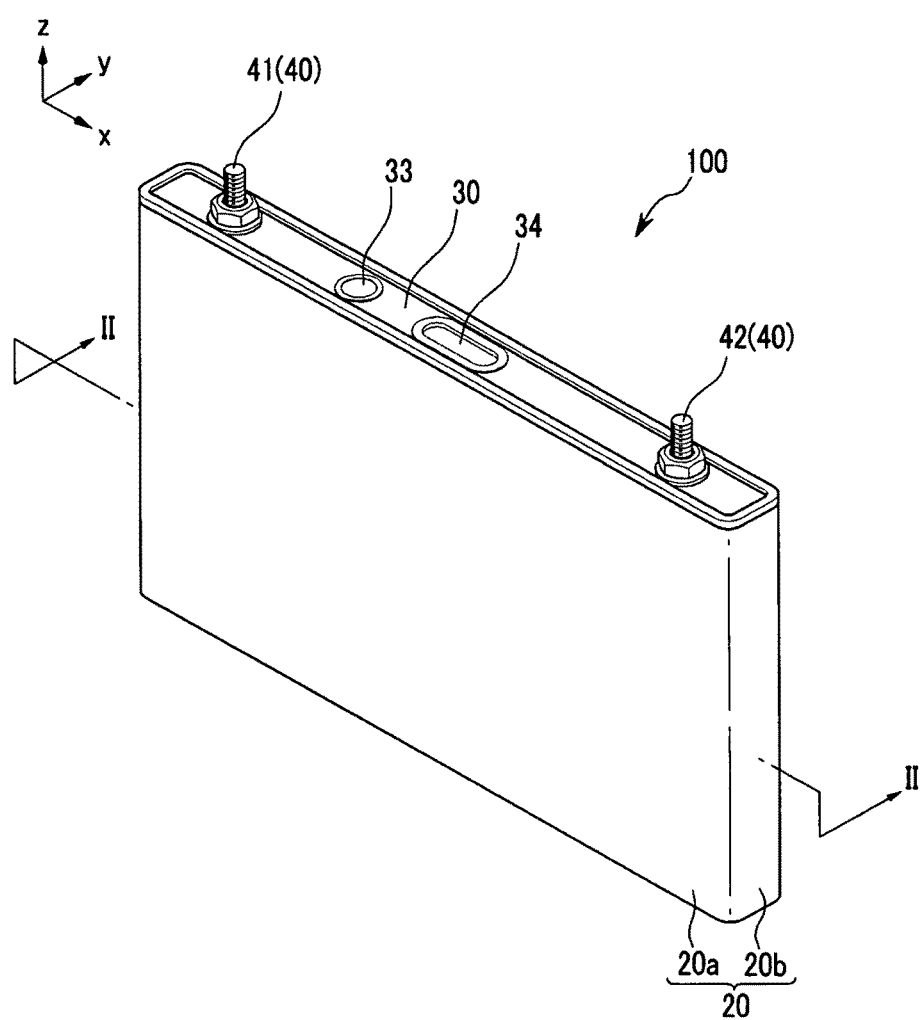
FIG. 1 illustrates a perspective view of a rechargeable battery according to an exemplary embodiment.

DESCRIPTION OF REFERENCE NUMERALS
INDICATING PRIMARY ELEMENTS IN THE
DRAWINGS

100, 200, 300: rechargeable battery
10: electrode group
20: case
30: cap plate
40: electrode terminal
50, 70: lead tab
60: current collecting plate
111, 121: uncoated part
11: positive electrode
12: negative electrode
13: separator
31 terminal hole
32: electrolyte solution injection hole
33: seal stopper
34: vent plate
35: vent hole
41: positive electrode terminal
42: negative electrode terminal
43: outside insulator
44: inside insulator
51, 52: first and second vertical parts
53, 73: connection part
54: horizontal part
71, 72: first and second vertical parts
531, 532: first and second connection parts
711, 721: gap part
712, 722: second gap part
731, 732: first/second connection parts
C: gap
C1, C2: first and second gaps
EP: end part
EX, EY: gas outlet
EX1, EX2: first and second gas outlets
EY1, EY2: first and second gas outlets
S1 to S6, S2', S3': curved section

DETAILED DESCRIPTION

Korean Patent Application No. 10-2009-0056160, filed on Jun. 23, 2009, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer, element, or substrate, or intervening layers or elements may also be present. In addition, it will also be understood that when a layer or element is referred to as being "between" two layers or elements, it can be the only layer or element between the two layers or elements, or one or more intervening layers or elements may also be present. Like reference numerals refer to like elements throughout.

Figure 2:
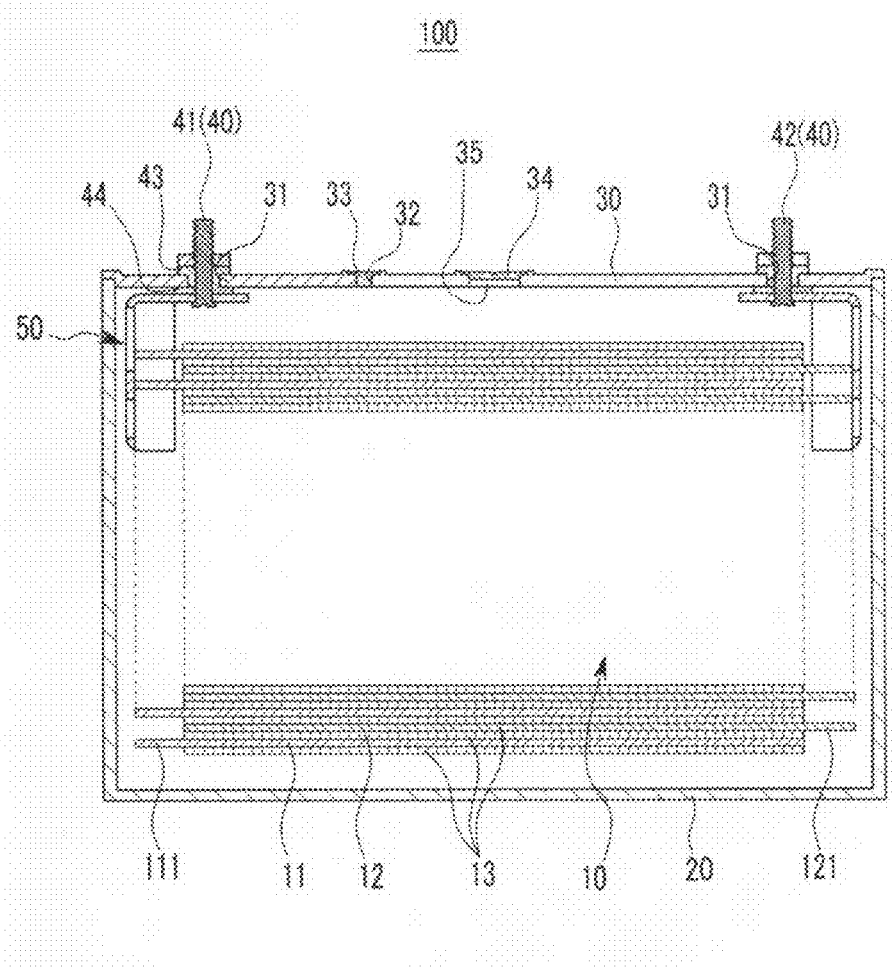
FIG. 2 illustrates a cross-sectional view taken along line II-II of FIG. 1.

FIG. 1 illustrates a perspective view of a rechargeable battery according to an exemplary embodiment, and FIG. 2 illustrates a cross-sectional view of the rechargeable battery taken along line II-II of FIG. 1. Referring to FIGS. 1 and 2, a rechargeable battery 100 may include a case 20 that houses an electrode group 10, a cap plate 30 that closes and seals an opening that is formed at one side of the case 20, an electrode terminal 40 that is installed in a terminal hole 31 of the cap plate 30, and a lead tab 50 that connects the electrode terminal 40 to the electrode group 10.

The electrode group 10 may include a separator 13, which is an insulator, a positive electrode 11, and a negative electrode 12. The positive and negative electrodes 11 and 12 may be disposed at both surfaces of the separator 13. The positive and negative electrodes 11 and 12 with the separator 13 therebetween may be formed in a jelly roll form by winding the positive electrode 11, the negative electrode 12, and the separator 13 together.

The positive electrode 11 and the negative electrode 12 may include a current collecting body that is formed of a metal foil of a thin plate and an active material that is coated on parts of a surface of the current collecting body. The positive electrode 11 and the negative electrode 12 may be partitioned into a coated part of the current collecting body that is coated with the active material and uncoated parts 111 and 121, i.e., portions of the current collecting body that are not coated with the active material. The coated part may define a majority of each of the positive electrode 11 and the negative electrode 12 in the electrode group 10, and the uncoated parts 111 and 121 may be disposed at both sides, respectively, of the coated part in a jelly roll state. In other words, as illustrated in FIG. 2, the uncoated parts 111 and 121 may be peripheral portions, i.e., edges, of the positive and negative electrodes 11 and 12, respectively.

The electrode group 10 may have any suitable shape, e.g., an approximate hexahedron. For example, the electrode group 10 may have wide front and rear areas in a jelly roll state, i.e., areas corresponding to sidewalls 20a of the case 20, and end parts EP (FIG. 3), i.e., areas corresponding to sidewalls 20b of the case 20. The end parts EP may be defined by edges of the uncoated parts 111 and 121, and may form narrow and long areas, thereby defining an approximate hexahedron with the wide front and rear areas of the electrode group 10.

Figure 3:
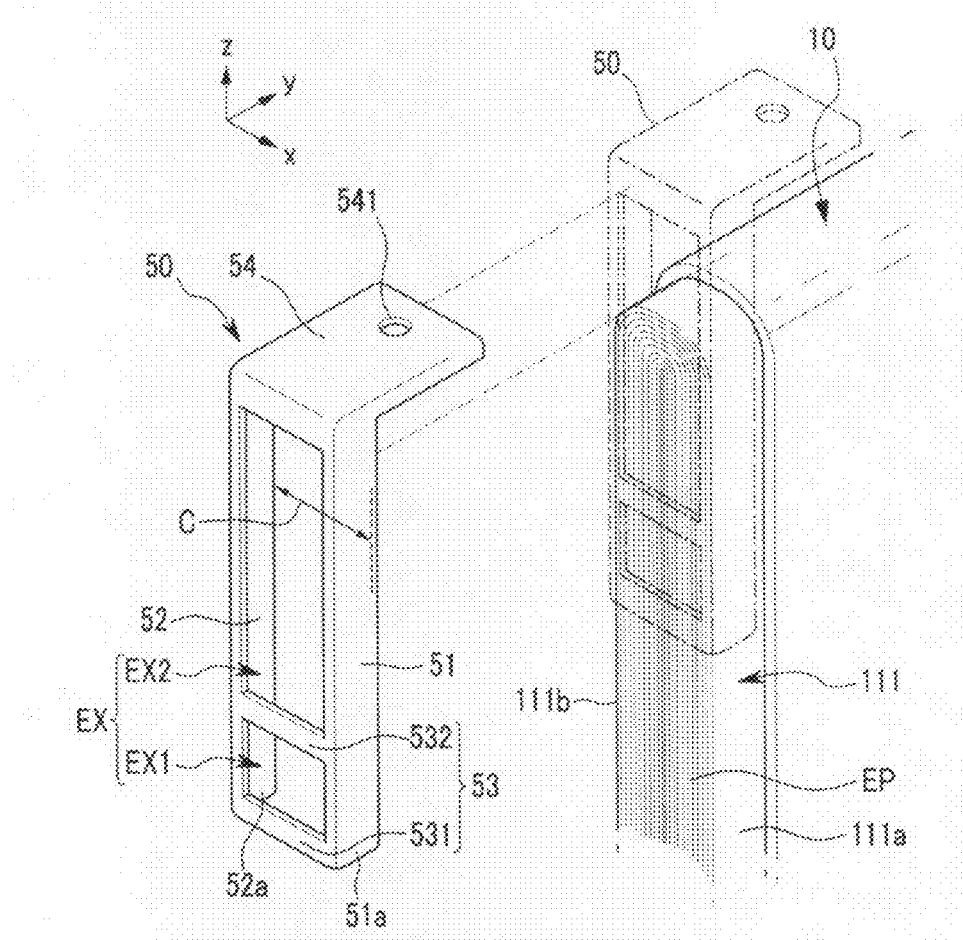
FIG. 3 illustrates an exploded perspective view of a lead tab and an electrode group according to an exemplary embodiment.

FIG. 3 illustrates an exploded perspective view of the lead tab 50 and the electrode group 10. It is noted that even though the uncoated parts 111 and 121 may be equally formed in the positive electrode 11 and the negative electrode 12, only the uncoated part 111 of the positive electrode 11 is illustrated in FIG. 3 and referred to hereinafter for ease of explanation. Gas generated by charge/discharge operations of the electrode group 10 may be discharged out of the electrode group 10 via the end part EP.

Referring to FIG. 3, since the positive and negative electrode 11 and 12 are wound, the uncoated part 111 may be continuously wound. That is, the end part EP of the uncoated part 111 may include gradually increasing lines having the same center. In other words, as illustrated in FIG. 3, a cross-section of the uncoated part 111 in the xz-plane may include a plurality of concentric ovals. In particular, as illustrated in FIG. 3, the cross-section of the uncoated part 111 in the xz-plane may include linear line portions along a z-axis direction and spaced apart from each other in an x-axis direction, and arc portions, e.g., a half-circle or a half-oval. Each of the arc portions connects two linear line portions, and is spaced apart from an adjacent arc portion along the z-axis direction. Each of the concentric ovals represent an edge of one layer of the wound uncoated part 111 of the positive electrode 11. The uncoated part 111 may include a front surface 111a and a rear surface 111b opposite the front surface 111a (FIG. 3), so the front and rear surfaces of the uncoated part 111 may face opposite sidewalls 20a of the case 20. As illustrated in FIG. 3, the lead tab 50 may be connected to the front and rear surfaces of the uncoated part 111, while gas may be discharged through the end part EP.

The case 20 may form the entire external appearance of the rechargeable battery 100, and may be made of a conductive metal, e.g., one or more of aluminum, aluminum alloy, nickel-plated steel, etc. Referring again to FIGS. 1 and 2, the case 20 may provide a space that houses the electrode group 10. For example, the case 20 may be formed to have a hexahedron shape with an opening at one side thereof, so a hexahedral electrode group 10 may be positioned in the case 20 through the opening. The opening may face upwardly, e.g., in an upper portion of the case 20, as illustrated in FIGS. 1 and 2.

The cap plate 30 may be formed with a thin plate, and may be coupled to the opening of the case 20 to close and seal the opening. In this way, the cap plate 30 may seal the inside of the case 20 from the outside, and may connect the inside thereof to the outside, as needed.

For example, as illustrated in FIG. 2, the cap plate 30 may include an electrolyte solution injection hole 32 for injecting an electrolyte solution into the sealed case 20. The electrolyte solution injection hole 32 may be sealed by a seal stopper 33 after injecting the electrolyte solution.

The cap plate 30 may further include a vent hole 35 and a vent plate 34 in the vent hole 35, e.g., the cap plate 34 may be welded in the vent hole 35. The vent plate 34 may have a plate shape, and may be thinner than the cap plate 30 along the z-axis direction. When internal pressure of the case 20 increases to greater than a preset value by a gas that is generated by charge/discharge operations of the electrode group 10, the vent plate 34 may be cut away to enable gas discharge through the vent hole, thereby preventing explosion of the rechargeable battery 100.

As further illustrated in FIG. 2, the cap plate 30 may have a terminal hole 31 for inserting the electrode terminal 40 that connects the positive electrode 11 and the negative electrode 12 of the electrode group 10 to the outside. For example, the electrode terminal 40 may be electrically insulated from the cap plate 30 by interposing an outside insulator 43 and an inside insulator 44 into the terminal hole 31.

The electrode terminal 40 may extend through the terminal hole 31 to the outside while being connected to the inside of the case 20. The electrode terminal 40 may include a positive electrode terminal 41 that is connected to the positive electrode 11 and a negative electrode terminal 42 that is connected to the negative electrode 12.

For example, the terminal hole 31, the inside insulator 44, and the outside insulator 43 may be formed with the same structure at the positive electrode terminal 41 side and the negative electrode terminal 42 side. Therefore, the positive electrode terminal 41, the terminal hole 31, the inside insulator 44, and the outside insulator 43, which is one side, are exemplified hereinafter.

The outside insulator 43 may be partially inserted into the terminal hole 31 from the outside of the cap plate 30 to electrically insulate the positive electrode terminal 41 from the cap plate 30. That is, the outside insulator 43 may insulate an outer surface of the positive electrode terminal 41 and an outer surface of the cap plate 30, and may simultaneously insulate an outer surface of the positive electrode terminal 41 from an internal surface of the terminal hole 31.

The inside insulator 44 may electrically insulate the cap plate 30 and the lead tab 50 to correspond to the terminal hole 31 at the inside of the cap plate 30. That is, the inside insulator 44 may insulate an upper surface of the lead tab 50 from an internal surface of the cap plate 30.

One side of the lead tab 50 may be connected to the electrode terminal 40 and another side of the lead tab 50 may be connected to the uncoated parts 111 and 121 of the electrode group 10, i.e., the lead tab 50 may connect the electrode terminals 40 to corresponding front and rear surfaces of the uncoated parts 111 and 121 of the electrode group 10. The uncoated parts 111 and 121 may be formed at opposite sides in the electrode group 10. The lead tab 50 may be formed in pairs, so each lead tab 50 may connect a corresponding one of the positive electrode 11 and the negative electrode 12 to the positive electrode terminal 41 and the negative electrode terminal 42, respectively.

The lead tab 50 according to the present exemplary embodiment may have a structure that secures strong welding rigidity with the electrode group 10 and that does not disturb a flow of a gas discharged to the end part EP of the electrode group 10. In particular, as illustrated in FIG. 3, the lead tab 50 may include a horizontal part 54, a first vertical part 51, a second vertical part 52, and a connection part 53.

The horizontal part 54 may be connected to the electrode terminal 40. The horizontal part 54 may extend parallel to a bottom of the case 20, and may overlap a portion of the battery group 10. The horizontal part 54 may include a through a hole 541 in an xy-plane, so the electrode terminal 40 may be inserted into the through hole 541 to be connected to the horizontal part 54.

The first vertical part 51 and the second vertical part 52 may extend from the horizontal part 54 in a downward direction, e.g., perpendicularly with respect to the horizontal part 54. The first and second vertical parts 51 and 52 may be spaced apart from each other, e.g., along the x-axis, to define a gap C therebetween, e.g., in the xz-plane. That is, the first and second vertical parts 51 and 52 may be parallel, and may extend along opposite edges of the electrode group 10, e.g., along respective front surface 111a and the rear surface of the uncoated part 111 as illustrated in FIG. 3.

As illustrated in FIG. 3, the first vertical part 51 and the second vertical part 52 may extend along a z-axis direction, and may be perpendicular to both sides of an x-axis direction of the horizontal part 54. As further illustrated in FIG. 3, each of the first and second vertical parts 51 and 52 may have a predetermined width, e.g., along the y-axis, and may overlap a portion of a respective front or rear surface of the uncoated part 111 in the battery group 10. Since the first and second vertical parts 51 and 52 form plates in the zy-plane that are opposite each other and overlap the uncoated parts 111 and 121, the first and second vertical parts 51 and 52 may support front and rear surfaces adjacent to the end part EP of the uncoated parts 111 and 121 wound in the electrode group 10 (see two-point chain line of FIG. 3). Because the first and second vertical parts 51 and 52 support the uncoated parts 111 and 121 in a surface contact state, the lead tab 50 and the electrode group 10 may form a stable coupling structure. Further, as the first and second vertical parts 51 and 52 overlap, e.g., only, the front and rear surfaces of the uncoated parts 111 and 121, the end part EP may remain exposed, e.g., for uninterrupted gas discharge.

The connection part 53 may connect parts of the first vertical part 51 and the second vertical part 52. For example, the connection part 53 may extend along the x-axis, e.g., perpendicularly with respect to the first and second vertical parts 51 and 52, to partially face the end part EP. The connection part 53 may be spaced apart from the horizontal part 54 along the z-axis. A width of the connection part 53 may be substantially small, e.g., the width of the connection part 53 along the z-axis may be smaller that the width of each of the first and second vertical parts 51 and 52 along the y-axis. The connection part 53 may be connected, e.g., welded, to the end part EP in an opposite portion of the end part EP, i.e., at a bottom portion thereof, and may integrally connect the first and second vertical parts 51 and 52. The connection between the connection part 53 to the first and second vertical parts 51 and 52 may secure structural rigidity of the separated first and second vertical parts 51 and 52, while being electrically connected to the end part EP.

Further, because the connection part 53 is partially opposite the end part EP, the connection part 53 together with the first and second vertical parts 51 and 52 may define a gas outlet EX, e.g., in the xz plane, that exposes the end part EP. In other words, the connection part 53 may be spaced apart from the horizontal part 54 along the z-axis to determine a predetermined length of the gas outlet EX along the z-axis, and the first and second vertical parts 51 and 52 may spaced apart to define a predetermined width of the gas outlet EX along the x-axis. Therefore, the gas outlet EX may have a sufficient size to allow gas smoothly discharge through the end part EP of the electrode group 10.

The lead tab 50 may include curved sections in connection portions among the horizontal part 54, the first vertical part 51, the second vertical part 52, and the connection part 53. The curved sections in the lead tab 50 may increase structural rigidity as compared, e.g., to that of an orthogonal sectional connection structure. The curved sections of the lead tab 50 will be described in more detail below with reference to FIGS. 5-7.

Figure 4:
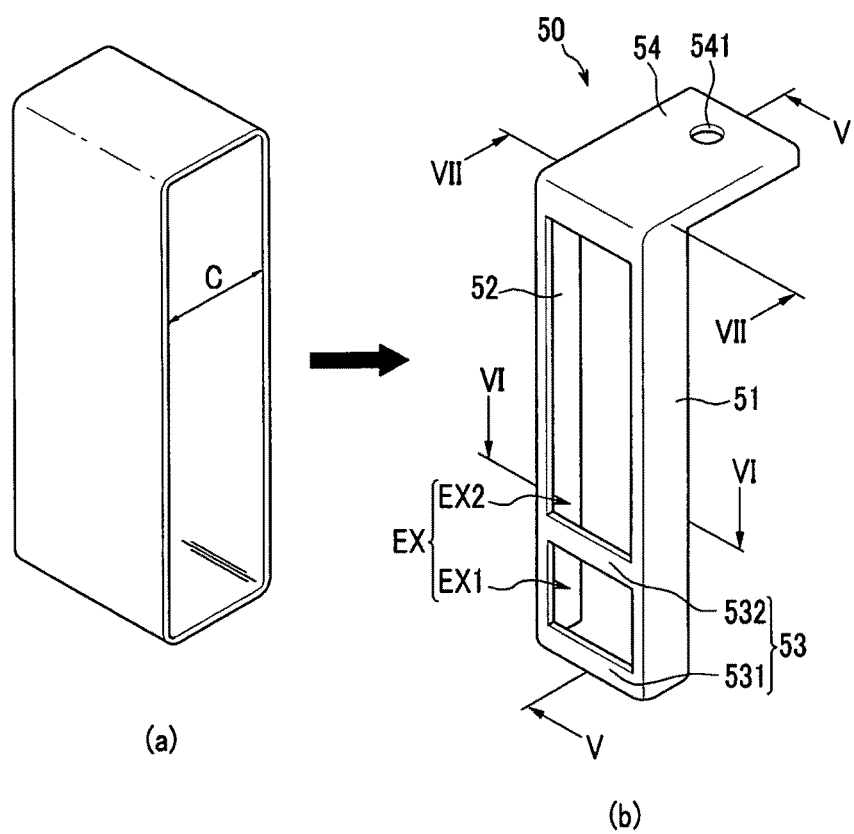
FIG. 4 illustrates perspective views of a manufacturing process of a lead tab according to an exemplary embodiment.

The lead tab 50 may be manufactured with various processes, and is described in an exemplary embodiment with reference to FIG. 4. FIG. 4 illustrates perspective views of stages in a manufacturing process of the lead tab 50. Referring to FIG. 4, manufacturing of the lead tab 50 may include a primary processing (part (a) of FIG. 4) including a drawing process of a plate, and a secondary processing (part (b) of FIG. 4) including cutting the drawn plate.

In detail, as illustrated in FIG. 4(a), a can having an opening may be formed via a drawing process. The opening may have a width corresponding to a width of the gap C. The can may be formed to have curved edges, e.g., where faces of the can meet, and may be configured to have the opening face and fit the end part EP of the electrode group 10. Next, as illustrated in FIG. 4(b), the drawn can may be cut to form the horizontal part 54, the first vertical part 51, the second vertical part 52, and the connection part 53. In particular, each of the five surfaces of the can may be processed, e.g., to remove portions thereof, to transform the can in FIG. 4(a) into the lead tab 50 in FIG. 4(b). The primary drawing processing (FIG. 4(a)) may allow a curved section to be easily formed in a connected portion of the horizontal part 54, the first vertical part 51, the second vertical part 52, and the connection part 53.

Figure 5:
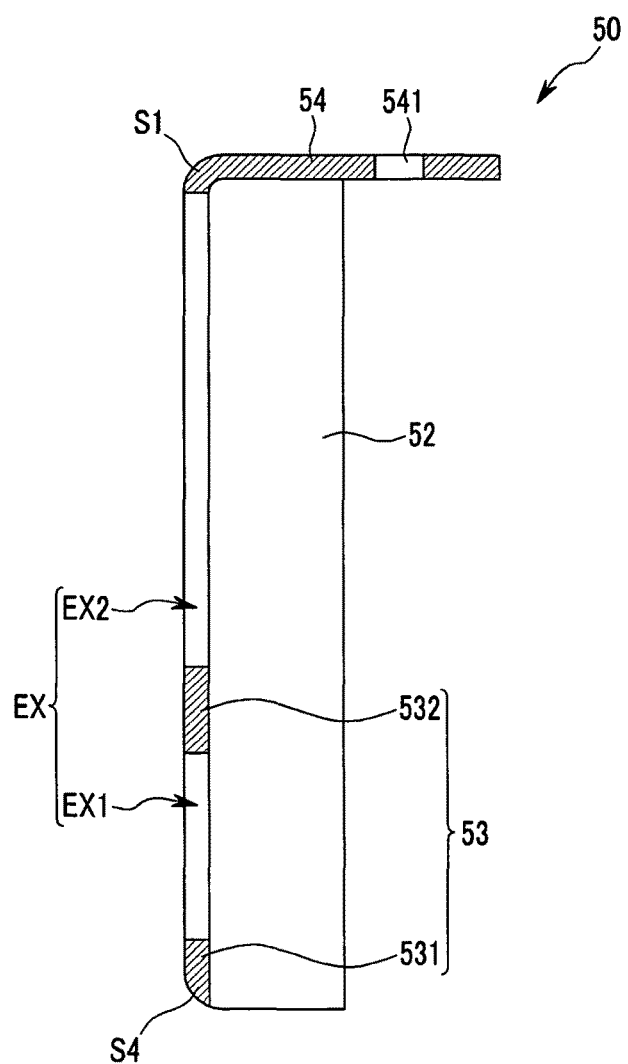
FIG. 5 illustrates a cross-sectional view of a lead tab taken along line V-V of FIG. 4(*b*)
Figure 6:
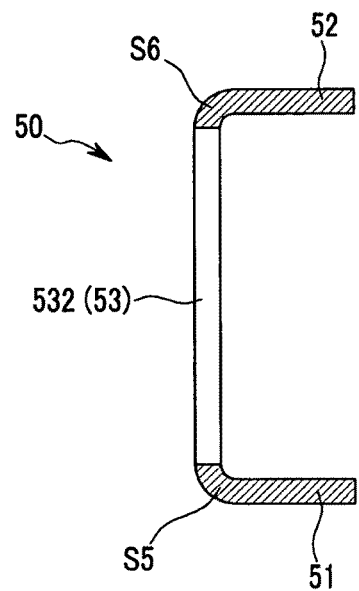
FIG. 6 illustrates a cross-sectional view of a lead tab taken along line VI-VI of FIG. 4(*b*)

The curved sections of the lead tab 50 will be described in more detail below with reference to FIGS. 5-7. FIG. 5 illustrates a cross-sectional view of the lead tab 50 taken along line V-V of FIG. 4(b), FIG. 6 illustrates a cross-sectional view of the lead tab 50 taken along line VI-VI of FIG. 4(b), and FIG. 7 illustrates a cross-sectional view of the lead tab 50 taken along line VII-VII of FIG. 4(b).

Referring to FIG. 5, the horizontal part 54 may include a curved section S1. As illustrated in FIGS. 3 and 5, the curved section S1 may extend from the horizontal part 54 toward the gas outlet EX, e.g., along an entire distance between the first and second vertical parts 51 and 52 in the x-axis. The curved section S1 may define a top side of the gas outlet EX, and may increase rigidity of the horizontal part 54 that is exposed to the gas outlet EX.

Figure 7:
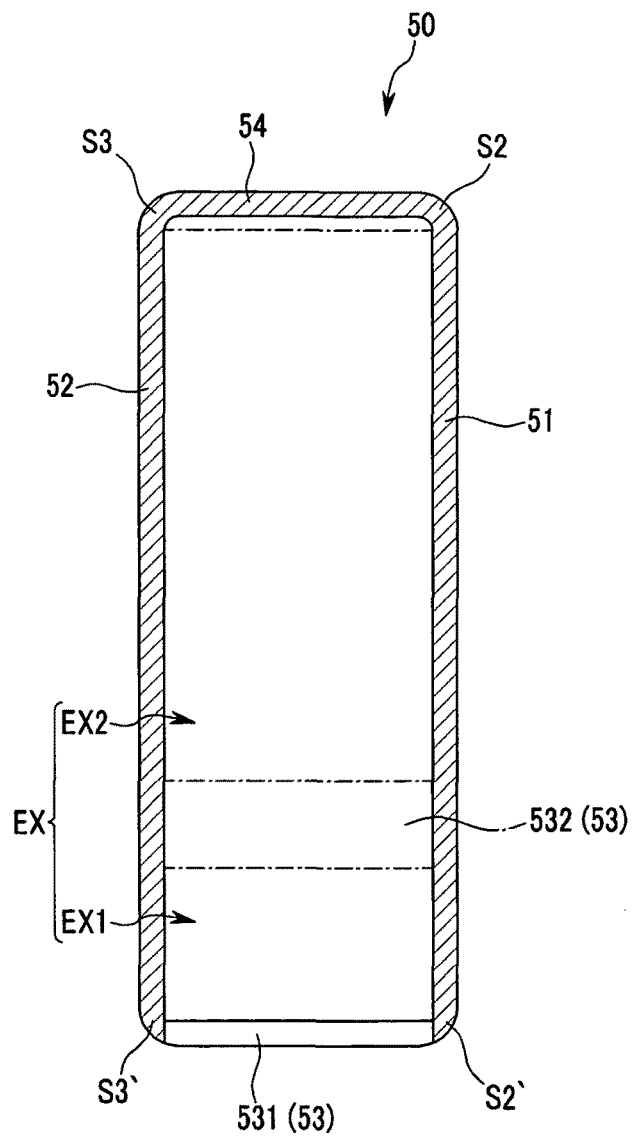
FIG. 7 illustrates a cross-sectional view of a lead tab taken along line VII-VII of FIG. 4(*b*)

Referring to FIG. 7, a connection between the horizontal part 54 and each of the first vertical part 51 and the second vertical part 52 may include curved sections S2 and S3, respectively. As illustrated in FIGS. 3 and 7, the curved sections S2 and S3 may connect the horizontal part 54 to the first and second vertical parts 51 and 52, respectively, and may extend along the y-axis. Further, as illustrated in FIG. 7, connections between a bottom of the connection part 53, i.e., bottom ends 51a and 52a of the first and second vertical parts 51 and 52, to the first and second vertical parts 51 and 52 may include curved sections S2' and S3', respectively. As illustrated in FIG. 7, the curved sections S2' and S3' may be opposite the curved sections S2 and S3, respectively. The curved sections S2', S3', S2, and S3 may increase rigidity of the connection between the horizontal part 54, the first and second vertical parts 51 and 52, and the connection part 53.

Referring to FIGS. 3-5, the connection part 53 may include a first connection part 531 and a second connection part 532. It is noted however that embodiments may include a single connection part 53 or a plurality of connection parts 53. If example embodiments include a single connection part 53, the single connection part 53 may be opposite the horizontal part 54 to connect bottom ends 51a and 52a of the first and second vertical parts 51 and 52.

If example embodiments include a plurality of connection parts 53, as illustrated in FIGS. 3-5, the first connection part 531 may be formed at the bottom ends 51a and 52a of the first and second vertical parts 51 and 52 at an opposite side of the horizontal part 54 to connect the first and second vertical parts 51 and 52. The second connection part 532 may be separated from the first connection part 531 in the z-axis direction to connect the first and second vertical parts 51 and 52.

The first and second connection parts 531 and 532 may partition the gas outlet EX into a first gas outlet EX1 that is formed at the first connection part 531 side, i.e., adjacent thereto, and a second gas outlet EX2 that is formed at the horizontal part 54 side, i.e., adjacent thereto, and may further strengthen rigidity of the first and second vertical parts 51 and 52, e.g., increase strength of the first and second vertical parts 51 and 52 that are divided at the end part EP. Further, the first and second connection parts 531 and 532 may be welded to the end part EP of the electrode group 10 to increase a welding area between the lead tab 50 and the electrode group 10, thereby reducing electrical resistance.

As illustrated in FIG. 5, the first connection part 531 may form a curved section S4 at the gas outlet EX side, i.e., at the first gas outlet EX1 side. The curved section S4 may increases rigidity of the ends of the first and second vertical parts 51 and 52 and the first connection part 531. As illustrated in FIG. 6, a connection between the second connection part 532 and the first vertical part 51 and a connection between the second connection part 532 and the second vertical part 52 may form curved sections S5 and S6, respectively, thereby increasing rigidity of the connections.

Figure 8:
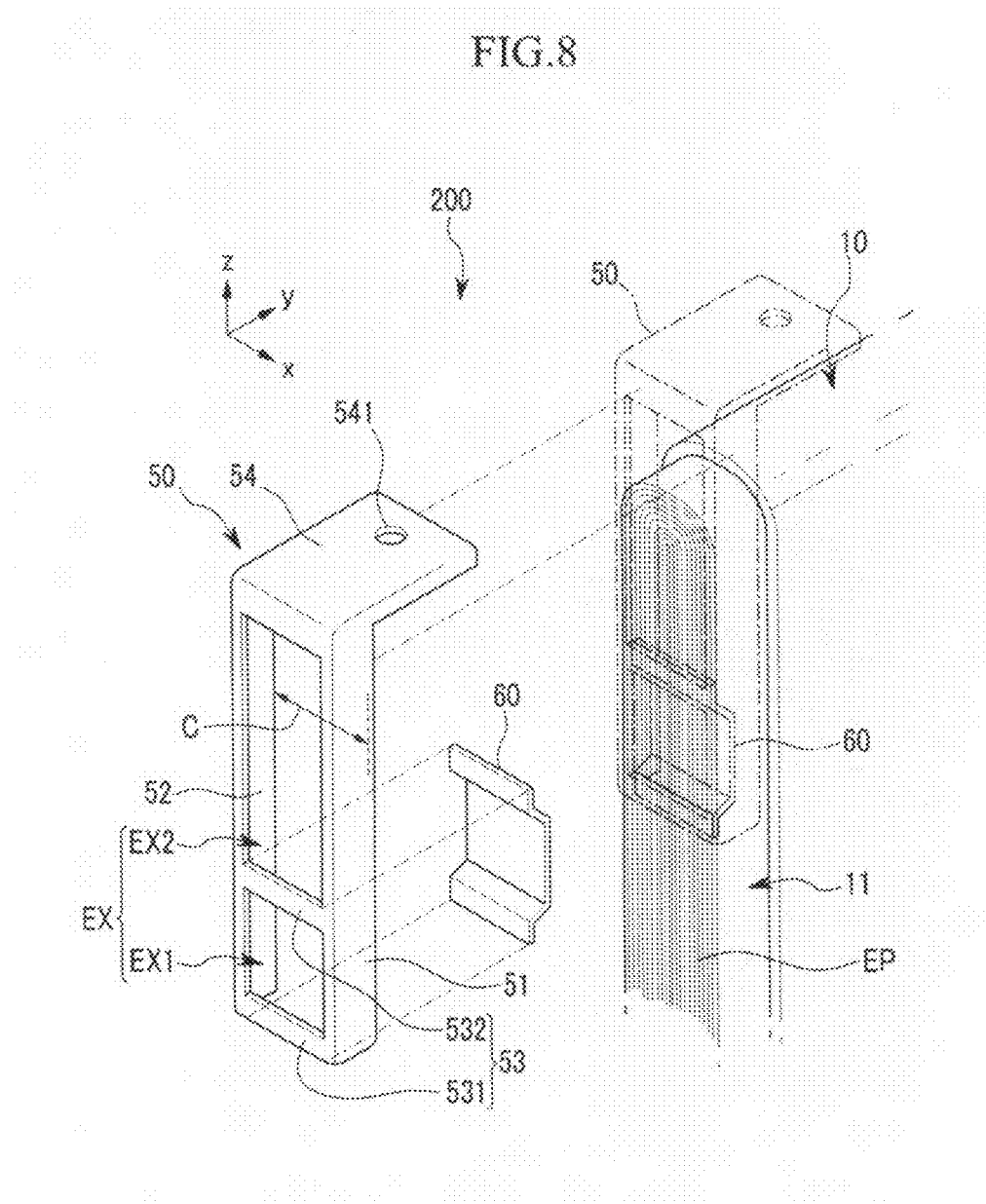
FIG. 8 illustrates an exploded perspective view of a lead tab and an electrode group in a rechargeable battery according to another exemplary embodiment.

FIG. 8 illustrates an exploded perspective view of a lead tab, a current collecting plate, and an electrode group in a rechargeable battery according to another exemplary embodiment. A rechargeable battery 200 in FIG. 8 may be substantially the same as the rechargeable battery 100 described previously with reference to FIGS. 1-7, with the exception of including a current collecting plate 60 interposed between an end part EP of the uncoated parts 111 and 121 of the electrode group 10 and the lead tab 50.

Therefore, as the lead tab 50 is welded to the current collecting plate 60 and the current collecting plate 60 is welded to the end part EP of the electrode group 10, the electrode group 10 and the lead tab 50 may be electrically connected. In addition, first and second vertical parts 51 and 52 of the lead tab 50 may support the front surface and the rear surface of the uncoated parts 111 and 121, respectively.

The connection part 53, i.e. first and second connection parts 531 and 532, may be welded to the current collecting plate 60, e.g., to horizontal portions of the current collector 60. In this case, the current collecting plate 60 may be connected to the first and second connection parts 531 and 532 by welding to correspond to the first gas outlet EX1, e.g., overlap the first gas outlet EX1. The current collecting plate 60 may sustain a second gas outlet EX2 in an open state above the first gas outlet EX1, while sealing the first gas outlet EX1.

The current collecting plate 60 may minimize interception of the gas outlet EX while substantially minimizing electrical resistance by increasing a welding area between the lead tab 50 and the end part EP, thereby allowing gas to discharge from the end part EP. That is, gas may flow via the second gas outlet EX2 from the end part EP.

Figure 9:
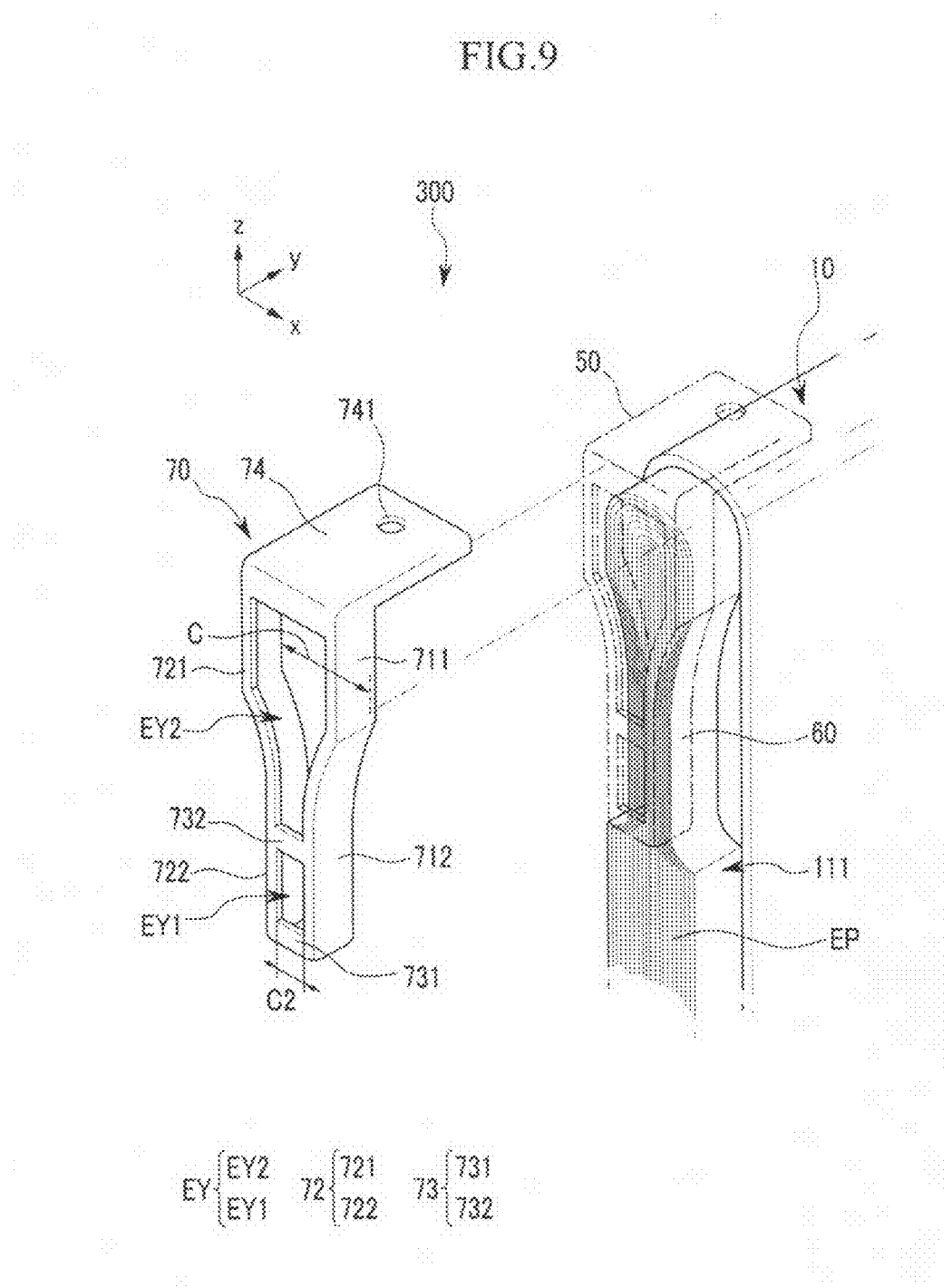
FIG. 9 illustrates an exploded perspective view of a lead tab and an electrode group in a rechargeable battery according to another exemplary embodiment.

FIG. 9 illustrates an exploded perspective view of a lead tab and an electrode group in a rechargeable battery according to another exemplary embodiment. A rechargeable battery 300 in FIG. 9 may be substantially the same as the rechargeable battery 100 described previously with reference to FIGS. 1-7, with the exception of including a gap between first and second vertical parts 71 and 72 in a lead tab 70 in at least two forms. The first and second vertical parts 71 and 72 may include first gap parts 711 and 721 having the same first gap C1 as that of the first exemplary embodiment, i.e., gap C described previously with reference to FIG. 3, and second gap parts 712 and 722 connected to the first gap parts 711 and 721 and having a second gap C2.

The first gap parts 711 and 721 may form the first gap C1 having a width of the same size as that of a horizontal part 74 in an entire z-axis direction range. The second gap parts 712 and 722 may have smaller widths than those of the first gap parts 711 and 721, respectively, to be extended while compressing an uncoated part 111, thereby forming the second gap C2 that is smaller than the first gap C1.

A connection part 73 may include first and second connection parts 731 and 732 that are separated from each other in the z-axis direction. The first connection part 731 may be welded to the uncoated part 111 while connecting the ends of the second gap parts 712 and 722 of the first and second vertical parts 71 and 72. The second connection part 732 may be welded to the uncoated part 111 while connecting the second gap parts 712 and 722 at the border of the first and second gap parts 712 and 722.

The second gap parts 712 and 722 may be welded to the uncoated parts 111 and 121 of the electrode group 10 while compressing the uncoated parts 111 and 121 of the electrode group 10, thereby further increasing bonding rigidity with the uncoated parts 111 and 121. Therefore, the second connection part 732 may partition the gas outlet EY into a first gas outlet EY1 that is formed at the first connection part 731 side and a second gas outlet EY2 that is formed smaller than the first gas outlet EY1 at a horizontal part 74 side. That is, a gas may flow via the first gas outlet EY1 and the second gas outlet EY2 in the end part EP.

In the lead tab 70, a connection between neighboring elements among the first and second vertical parts 71 and 72, the first and second connection parts 731 and 732, and the horizontal part 74 may be formed in a curved section, as discussed previously with reference to FIGS. 4-7, thereby increasing structural rigidity.

In a rechargeable battery according to an exemplary embodiment, a lead tab that connects an electrode terminal and an electrode group may include a horizontal part, first and second vertical parts, and a connection part. The first and second vertical parts may be spaced apart and support a front surface and rear surface of the electrode group, and the connection part may be welded while being partially opposite to an end part and may also connect the first and second vertical parts. By the connection part, welding rigidity of the lead tab and the electrode group may be secured. Further, by the first and second vertical parts and the connection part, the lead tab may form a gas outlet in an opposite portion to an end part of the electrode group, so the end part may be exposed. As such, flow of gas generated in the rechargeable battery may be smoothly discharged through the end part of the electrode group to the gas outlet without interruption and while the lead tab provides sufficient structural rigidity and stability.

In contrast, in a conventional battery, e.g., a battery with a lead tab coupled with a structure surrounding both side winding end parts of the electrode group and a front surface and rear surface adjacent to the end parts to be welded to the end parts, the conventional lead tab may have a structure that overlaps and blocks, e.g., entirely, the end parts of the electrode group, so the conventional lead tab may intercept and interrupt gas discharge through the end parts of the electrode group. As further contrast, if only a portion of the conventional lead tab is welded to the electrode group, it may be difficult for the lead tab to secure structurally stable rigidity.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
    an electrode group including a separator, a positive electrode, and a negative electrode;
    a case housing the electrode group;
    a cap plate for sealing the case, the cap plate including a terminal hole;
    an electrode terminal extending through the terminal hole; and
    a lead tab connecting the electrode terminal to the electrode group, the lead tab including:
        a horizontal part connected to the electrode terminal,
        a first vertical part and a second vertical part spaced apart from each other and extending from the horizontal part in a vertical direction along the electrode group, and
        a connection part connecting the first vertical part and the second vertical part, the connection part being spaced apart from the horizontal part to define a gas outlet that overlaps an end part of the electrode group,
    wherein:
        the end part includes edges of uncoated portions of the negative or positive electrodes,
        the first vertical part has a first surface facing the electrode group,
        the second vertical part has a second surface facing the electrode group,
        the first surface and the second surface face each other and are separated by a distance, and
        a width of the gas outlet is substantially equal to the distance.

2. The rechargeable battery as claimed in claim 1, wherein each of a connection section between the horizontal part and the first vertical part and a connection section between the horizontal part and the second vertical part is curved.

3. The rechargeable battery as claimed in claim 1, wherein the horizontal part includes a curved section along a side of the gas outlet.

4. The rechargeable battery as claimed in claim 1, wherein each of a connection section between the connection part and the first vertical part and a connection section between the connection part and the second vertical part is curved.

5. The rechargeable battery as claimed in claim 1, wherein edges between respective surfaces among the horizontal part, the first vertical part, the second vertical part, and the connection part are curved.

6. The rechargeable battery as claimed in claim 1, wherein the connection part includes a first connection part connecting bottom ends of the first and second vertical parts, the first connection part and the horizontal part being at opposite ends of each of the first and second vertical parts.

7. The rechargeable battery as claimed in claim 6, wherein the first connection part includes a curved section along a side of the gas outlet.

8. The rechargeable battery as claimed in claim 6, wherein the connection part further comprises a second connection part separated from the first connection part, the second connection part connecting the first vertical part and the second vertical part and partitioning the gas outlet into a first gas outlet adjacent the first connection part and a second gas outlet adjacent the horizontal part.

9. The rechargeable battery as claimed in claim 1, further comprising a current collecting plate interposed between the end part of the electrode group and the lead tab.

10. The rechargeable battery as claimed in claim 9, wherein the current collecting plate is attached to the end part, and the connection part is attached to the current collecting plate.

11. The rechargeable battery as claimed in claim 10, wherein the connection part includes:
    a first connection part connecting bottom ends of the first and second vertical parts, the first connection part and horizontal part being at opposite ends of each of the first and second vertical parts; and
    a second connection part separated from the first connection part to connect the first vertical part and the second vertical part,
    wherein the current collecting plate contacts the first connection part and the second connection part.

12. The rechargeable battery as claimed in claim 1, wherein the first and second vertical parts extend along and overlap respective front and rear surfaces of the electrode group.

13. The rechargeable battery as claimed in claim 12, wherein the first vertical part and the second vertical part define a gap therebetween, the gap extending along an entire vertical direction between the first and second vertical parts.

14. The rechargeable battery as claimed in claim 12, wherein the first vertical part and the second vertical part define a first gap and a second gap therebetween, the first gap having a top width substantially equal that of the horizontal part, and the second gap extending to the first gap and having a width smaller than the top width of the first gap.

15. The rechargeable battery as claimed in claim 14, wherein the connection part includes:
    a first connection part connecting bottom ends of the first and second vertical parts, the bottom end being at a bottom of the second gap; and
    a second connection part separated from the first connection part to connect the first vertical part and the second vertical part, the second connection part being between the first and second gaps,
    wherein the second connection part partitions the gas outlet into a first gas outlet adjacent the first connection part and a second gas outlet adjacent the horizontal part.

16. The rechargeable battery as claimed in claim 1, wherein the connection part and the horizontal part contact opposing ends of each of the first and second vertical parts, the gas outlet being between the connection part and horizontal part.

17. The rechargeable battery as claimed in claim 16, wherein the gas outlet is an opening with a predetermined width and length, the predetermined width substantially overlapping a majority of a width of the end part of the electrode group, and the predetermined length extending from the horizontal part to the connection part.

18. The rechargeable battery as claimed in claim 1, wherein the gas outlet exposes a majority of the end part of the electrode group, and the end part is arranged between the front and rear surfaces of the electrode group.

19. A method of forming a rechargeable battery, comprising:
    forming an electrode group in a case, the electrode group including a separator, a positive electrode, and a negative electrode;
    forming an electrode terminal extending through a terminal hole in a cap of the case; and
    forming a lead tab connecting the electrode terminal to the electrode group, the lead tab including:
        a horizontal part connected to the electrode terminal,
        a first vertical part and a second vertical part spaced apart from each other and extending from the horizontal part in a vertical direction along the electrode group, and
        a connection part connecting the first vertical part and the second vertical part, the connection part being spaced apart from the horizontal part to define a gas outlet that overlaps an end part of the electrode group,
    wherein:
        the end part includes edges of uncoated portions of the negative or positive electrodes,
        the first vertical part has a first surface facing the electrode group,
        the second vertical part has a second surface facing the electrode group,
        the first surface and the second surface face each other and are separated by a distance, and
        a width of the gas outlet is substantially equal to the distance.

20. The method as claimed in claim 19, wherein forming the lead tab includes:
    drawing a plate to form a can having an opening, such that edges connecting each two faces of five faces of the can are curved; and
    processing the five faces of the can into the horizontal part, the first vertical part, the second vertical part, and the connection part, such that the horizontal part, the first vertical part, the second vertical part, and the connection part are connected via curved sections.

* * * * *